Oct. 4, 1955

E. J. KACZOR 2,719,667

LUBRICATING SYSTEM FOR ROTATING EQUIPMENT
HAVING A VERTICAL SHAFT

Filed Jan. 11, 1951

INVENTOR.
EDWARD J. KACZOR
BY
Alfred C. Body
ATTORNEY

United States Patent Office 2,719,667
Patented Oct. 4, 1955

2,719,667

LUBRICATING SYSTEM FOR ROTATING EQUIPMENT HAVING A VERTICAL SHAFT

Edward J. Kaczor, Cleveland, Ohio, assignor to The Ohio Crankshaft Company, Cleveland, Ohio, a corporation of Ohio Application January 11, 1951, Serial No. 205,506

6 Claims. (Cl. 233—4)

This invention pertains to the art of lubrication and, more particularly, to a dirt trap for lubricating oil used in rotating equipment having a vertical axis of rotation.

The invention is particularly adapted for use on electric motors and/or generators of the type wherein the rotor rotates on a vertical axis and the invention will be particularly described with reference to such equipment, although it will be appreciated that it has broader applications.

In equipment of the type referred to, the bearing supporting the lower end of the rotor shaft is required to carry heavy mechanical loads. Lubrication of these bearings is very important. It is generally not possible to run these bearings submerged in oil. The churning action of the oil which results generates large amounts of heat which must be removed by suitable cooling means. Normally, the oil is fed to the bearings in metered amounts.

It has been proposed heretofore to pump oil axially upwardly through a vertical passage in the shaft to a point above the bearings and then allow the oil to flow radially outwardly through the shaft and to the bearing and thence back to a sump. Dirt in the lubricating oil has always been a problem. This dirt may be introduced into the machine when new oil is supplied or the dirt may be leavings and chips from the process of manufacture, or the dirt may be in particles that break or wear off during the operation of the machine. Heretofore, complicated and expensive filters have been employed to remove the dirt and prevent it from reaching, and possibly damaging, the bearings.

Dirt of the type to which this invention pertains is that which is normally heavier than the lubricating oil itself but of sufficiently small size to be picked up and carried by the moving oil much as sand is carried by moving water in a river.

The invention contemplates a simple and effective trap for dirt in the lubricating oil in equipment of the type referred to. In accordance with the invention, the passage in the shaft is provided with a continuous radial slot or opening intermediate the point where the lubricating oil enters the passage and the point where it leaves the passage so that, as the shaft rotates and the oil flows up the passage, the dirt is centrifuged into the slot where it can be accumulated and will remain. In preferred embodiments of the invention, the lower side wall of the slot is so formed so that, when the rotation of the shaft is stopped, the dirt will be prevented from falling out of the slot and back into the passage in the shaft. This may be accomplished by providing the inner edge of the lower wall of the slot with an upstanding lip or by sloping the lower wall downwardly and outwardly away from the passage. In a broader aspect of the invention, the passage may be provided with a shoulder facing downwardly, the direction from which the oil flows. With such an arrangement, the dirt particles will be centrifuged out radially and cannot pass beyond the shoulder. However, when the shaft stops rotating, the dirt particles gathered will, of course, fall by gravity into the oil stream to be centrifuged out again when the shaft is again rotated.

The principal object of the invention is the provision of new and improved means for removing the entrained dirt in an oil stream passing vertically upwardly through an axial passage in a vertical rotating shaft which is simple and effective in operation, easily constructed and requires no maintenance.

Another object of the invention is the provision of new and improved means in equipment of the type referred to for centrifuging dirt particles from the oil which comprises a radial slot opening outwardly from the vertical oil passage in the rotating shaft through which the oil passes.

A more specific object of the invention is the provision of a new and improved dirt trap for the oil passing vertically upwardly in an axial passage of a vertical shaft rotating at a relatively high rate of speed, which trap comprises a continuous radial slot opening outwardly from the passage, the slot having means to prevent the return of any dirt particles centrifuged thereinto.

Other and more specific objects will appear upon a reading and understanding of this specification.

The invention will be specifically set forth and defined in the claims appended hereto. The invention may take physical embodiment in a number of different-appearing parts and arrangement of parts and a preferred embodiment of one arrangement of parts will be described in detail in this specification and illustrated in the accompanying drawings which are a part hereof, and wherein:

Figure 1:
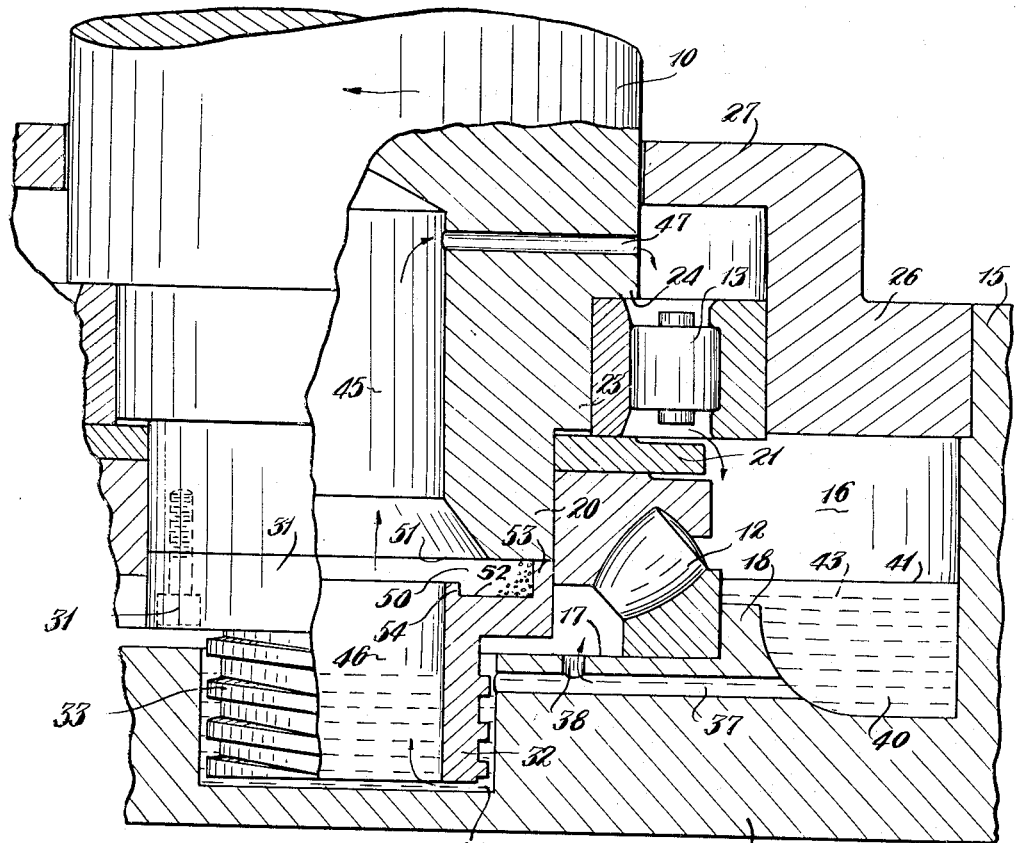
Figure 1 is a fragmentary side sectional view of the lower end of the housing and shaft of a motor-generator unit embodying and illustrating the present invention.

Referring now to the drawings which are only for the purposes of illustrating the invention and not for the purposes of limiting it, Figure 1 shows a vertically extending shaft 10 journalled for rotation on a base 11 by a pair of bearings 12 and 13. The bearing 12 is for the purpose of supporting the vertical weight of the shaft while the bearing 13 is for the purpose of supporting the shaft against radial movements and loads.

The base 11 may be of any convenient construction but is generally and preferably a casting machined to the required dimensions and includes, generally, a central cylindrical well or bore 14 coaxial with the axis of rotation of the shaft 10; an upstanding cylindrical flange 15 spaced a considerable distance from the axis of rotation to form an oil sump or reservoir 16 within the base itself, and a flat surface 17 intermediate the well 14 and the flange 15 on which the lower side of the outer race of the bearing 12 rests and is confined against radial movement by an upstanding cylindrical shoulder 18. The inner race of the bearing 12 fits snugly around a portion 20 of reduced diameter on the shaft 10 and has a bearing on its upper surface, a flat, washer-like member 21, on the upper surface of which, in turn, the lower side of the inner race of the bearing 13 rests. The shaft 10 is reduced in diameter, as at 23, to fit snugly inside of the inner race of the bearing 13 and has a shoulder 24 which bears on the upper surface of this inner race. The outer race of the upper bearing 13 fits into the opening of a ring-like member 26 which, in turn, fits into the upstanding cylindrical flange 15, thus transmitting radial forces of the shaft 10 to the base 11. The ring member 26 has an upstanding portion 27 which extends radially inwardly toward the outer surface of the shaft 10. This portion 27, as shown, is spaced above the upper surface of the upper bearing 13 and forms an oil seal to prevent lubricating oil from passing into the interior of the motor. A labyrinth seal could be employed if desired.

The lower end of the shaft 10 has a cylindrical sleeve 30 mounted coaxially thereon, including an upper portion 31 of an external diameter approximating the external diameter of the lower end of the shaft 10 and a lower portion 32 of a lesser diameter which extends into the well 14 of the base 11. As shown, the lower end of the portion 32 is spaced from the bottom of the well 14. The lower portion 32 has helical teeth formed on the outer surface thereof, the outer diameter of which is approximately the diameter of the well 14. These teeth function as an oil pump when the shaft rotates.

The base 11 is also provided with a plurality of generally horizontal openings 37 which communicate the lower portion of the oil sump 16 with the upper portion of the well 14. An opening 38 located just radially inwardly of the lower race of the bearing 12 communicates the passages 37 with the roller members of the bearing 12.

As shown, the shaft 10 and the sleeve 30 have aligned axial passages 45 and 46 respectively extending through the bottom of the portion 32 to a point in the shaft above the upper surface of the upper bearing 13. The passage 45 at the upper end communicates radially outwardly of the shaft 10 through a plurality of radial openings 47 which, as shown, are located above the upper bearings 13.

Before commencing operation; that is, in the static condition, the lubricating oil 40 is at a level as shown by the line 41. When the shaft 10 commences to rotate, the helical teeth 33 on the outer surface of the portion 32 pump the oil 40 through the passage 37 and downwardly and around the bottom side of the portion 32 and thence vertically upwardly through the passages 45 and 46 to and through the passages 47 where the oil spills onto the upper bearing 13, lubricates it and then flows back into the sump 16.

Figure 2:
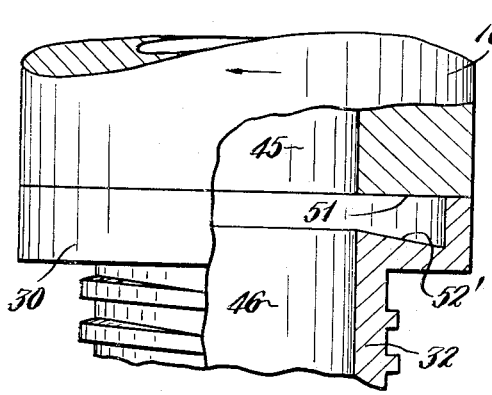
Figure 2 is a fragmentary side view of the lower end of the shaft partly in section showing an alternative arrangement of the invention.

In accordance with the invention, the passage 45 is provided with means for centrifuging any dirt which might be entrained in the oil 40 and removing it from the oil stream, preferably, permanently. In the embodiment of the invention shown in Figure 1, these means comprise a continuous radial slot 50 in the side walls of the passages 45 and 46 defined by an upper side wall 51 which is the lower end of the shaft 10, a lower side wall 52 which is the upper surface of a cylindrical recess in the upper inner edge of the sleeve 30 and an outer radial side wall 54 which is the inner surface of an upstanding cylindrical flange 53 on the sleeve 30. The lower wall 52 is preferably horizontal and the inner edge thereof has an upstanding lip 54, the purpose of which is to prevent any dirt centrifuged in the slot 50 from returning into the passage 45 under the force of gravity when the shaft 10 is stopped from its rotation. Obviously, the lip 54 may be omitted if this function is not desired. Also, the equivalent in function can be obtained by sloping the lower side wall 52' outwardly and downwardly as is shown more clearly in the alternative embodiment illustrated in Figure 2. It will be noted that the passage 46 below the slot 50 is imperforate.

Figure 3:
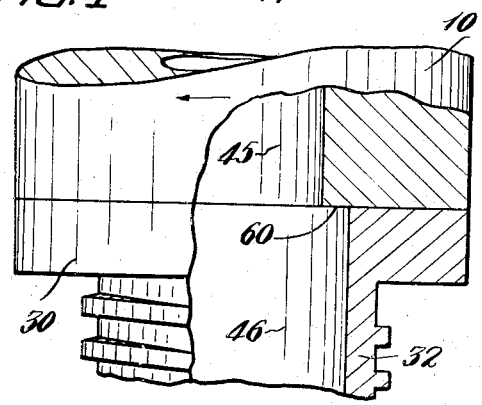
Figure 3 is a similar view showing a still further alternative embodiment of the invention.

Figure 3 shows a still further alternative embodiment of the invention which, while removing by the centrifuge process any dirt particles which might be entrained with the lubricating oil, does not permanently remove these particles from the oil stream. In this embodiment of the invention, the lower end of the shaft 10 has the sleeve-like member 30 fastened thereto in a manner similar to the preferred embodiment but the passage 45 in the lower end of the shaft 10 is smaller in diameter than the passage 46 in the sleeve-like member 30, thus providing a shoulder 60 which, because of the centrifuging action throwing the dirt particles entrained in the oil radially outwardly against the walls of the passage, will prevent the movement of the dirt particles upwardly beyond the shoulder. However, when the shaft 10 is stopped from rotating, it will be appreciated that these dirt particles will then fall back to the bottom of the well 14.

Thus it will be seen that embodiments of the invention have been described which are capable of accomplishing the objectives of the invention heretofore set forth and others. These embodiments have been described for the purposes of illustrating the invention only for, obviously, there are other embodiments and arrangements which can be constructed in accordance with the invention which, although differing radically in appearance, will come within the scope of the invention as defined by the appended claims.

Having thus described my invention, I claim:

1. In rotating equipment, a vertical shaft supported for rotation, an axial passage in said shaft defined by generally cylindrical side walls, means for moving lubricating oil upwardly through said passage when said shaft is rotating, said passage having a generally continuous radial slot opening outwardly therefrom intermediate the ends thereof and being imperforate below said slot.

2. In rotating equipment, a vertical shaft supported for rotation, an axial passage in said shaft defined by generally cylindrical side walls, means for moving lubricating oil upwardly through said passage when said shaft is rotating, a generally continuous radial slot in the side walls of said passage defined by a base and upper and lower side walls, the lower side wall being generally horizontal.

3. In rotating equipment, a vertical shaft supported for rotation, an axial passage in said shaft defined by generally cylindrical side walls, means for moving oil upwardly through said passage when said shaft is rotating, said passage having a generally continuous radial slot in the side walls thereof intermediate the ends of said passage, said slot being defined at least by an inwardly facing base and a lower side wall having an upwardly extending lip at the inner radial edge.

4. In rotating equipment, a vertical shaft supported for rotation, an axial passage in said shaft defined by generally cylindrical side walls, means for moving oil upwardly through said passage when said shaft is rotating, a generally continuous radial slot opening outwardly from the side walls of said passage intermediate the ends thereof said passage being imperforate below said slot, said slot having an inwardly facing base and a lower side wall which is inclined outwardly and downwardly.

5. A vertical shaft supported for rotation, an axial passage in the shaft defined by generally cylindrical side walls, means for moving oil upwardly through the passage when the shaft is rotating, a generally continuous radial slot opening outwardly from the side walls of the passage intermediate the ends thereof, the lower side wall of the slot being generally horizontal so as to prevent the return of the dirt to the passage under the force of gravity when the rotation of the shaft is stopped.

6. A vertical shaft supported for rotation, an axial passage in the shaft defined by generally cylindrical side walls, means for moving oil upwardly through said passage when the shaft is rotating, said passage having a downwardly-facing shoulder intermediate the ends of said passage and being imperforate below said shoulder, whereby dirt particles centrifuged outwardly against the walls of the passage cannot pass beyond the shoulder.

References Cited in the file of this patent

UNITED STATES PATENTS

| | | |
|---|---|---|
| 980,001 | Ponten | Dec. 27, 1910 |
| 1,757,289 | Boyd | May 6, 1930 |
| 1,868,814 | Brush | July 26, 1932 |
| 1,986,539 | Schmidt | Jan. 1, 1935 |
| 1,991,623 | Onsrud | Feb. 19, 1935 |
| 2,486,478 | Kennedy | Nov. 1, 1949 |